(12) United States Patent
Li (10) Patent No.: US 11,443,759 B2
(45) Date of Patent: Sep. 13, 2022

(54) INFORMATION PROCESSING APPARATUS, INFORMATION PROCESSING METHOD, AND STORAGE MEDIUM

(71) Applicant: HONDA MOTOR CO., LTD., Tokyo (JP)

(72) Inventor: Yuanchao Li, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 127 days.

(21) Appl. No.: 16/939,215

(22) Filed: Jul. 27, 2020

(65) Prior Publication Data

US 2021/0043222 A1 Feb. 11, 2021

(30) Foreign Application Priority Data

Aug. 6, 2019 (JP) .............................. JP2019-144793

(51) Int. Cl.
*G10L 15/00* (2013.01)
*G10L 15/16* (2006.01)
(Continued)

(52) U.S. Cl.
CPC ............ *G10L 25/63* (2013.01); *G06N 3/0445* (2013.01); *G06N 3/0472* (2013.01); *G06N 3/08* (2013.01);
(Continued)

(58) Field of Classification Search
CPC .. G06N 3/0445; G06N 3/0454; G06N 3/0472; G06N 3/08; G06N 3/084;
(Continued)

(56) References Cited

U.S. PATENT DOCUMENTS 7,729,914 B2 * 6/2010 Tato ........................ G10L 17/26
704/270
9,672,825 B2 * 6/2017 Arslan ...................... G10L 25/93
(Continued)

OTHER PUBLICATIONS

Satt et al., "Efficient emotion recognition from speech using deep learning on spectrograms", Interspeech 2017, Aug. 20-24, 2017, pp. 1089-1093, International Speech Communication Association, Stockholm, Sweden.
(Continued)

*Primary Examiner* — Khai N. Nguyen
(74) *Attorney, Agent, or Firm* — Thomas | Horstemeyer, LLP (57) ABSTRACT

An information processing apparatus includes a memory storing instructions. The instructions cause the apparatus to extract a plurality of local features from data indicating a speech, the characteristics of feature extraction being formed through learning; and to encode a series of chronological features of the data based on the plurality of local features, characteristics of encoding the series of chronological features being formed through learning. The instructions also cause the apparatus to generate information obtained by weighting features at a specific point in time associated with emotion classification, of the series of chronological features encoded, characteristics of weighting the features at the specific point in time being formed through learning; and to classify emotion corresponding to the data using the information obtained by weighting the features at the specific point in time, characteristics of classification being formed through learning.

11 Claims, 5 Drawing Sheets

(51) Int. Cl.
*G10L 25/63* (2013.01)
*G10L 25/18* (2013.01)
*G10L 15/22* (2006.01)
*G06N 3/04* (2006.01)
*G06N 3/08* (2006.01)
*G10L 15/02* (2006.01)

(52) U.S. Cl.
CPC .............. *G10L 15/02* (2013.01); *G10L 15/16* (2013.01); *G10L 15/22* (2013.01); *G10L 25/18* (2013.01)

(58) Field of Classification Search
CPC ......... G10L 15/02; G10L 15/16; G10L 15/22; G10L 25/18; G10L 25/30; G10L 25/51; G10L 25/63
USPC ........................................................ 704/232
See application file for complete search history.

(56) References Cited

U.S. PATENT DOCUMENTS

| | | | | |
|---|---|---|---|---|
| 9,697,826 B2* | 7/2017 | Sainath | ................... | H04R 3/005 |
| 9,886,957 B2* | 2/2018 | Seo | ........................ | G10L 17/04 |
| 9,916,538 B2* | 3/2018 | Zadeh | ..................... | G06K 9/627 |
| 10,515,626 B2* | 12/2019 | Li | ............................ | G10L 15/20 |
| 10,573,295 B2* | 2/2020 | Zhou | ....................... | G10L 15/063 |
| 10,657,955 B2* | 5/2020 | Battenberg | ............... | G10L 15/04 |
| 10,733,987 B1* | 8/2020 | Govender | ............... | G10L 17/06 |
| 10,839,788 B2* | 11/2020 | Feinauer | ................ | G10L 17/02 |
| 11,062,725 B2* | 7/2021 | Variani | ............... | G10L 21/0388 |
| 11,074,495 B2* | 7/2021 | Zadeh | .................. | G06N 3/0436 |
| 11,195,057 B2* | 12/2021 | Zadeh | ................... | G06N 3/0472 |
| 2003/0069728 A1* | 4/2003 | Tato | ........................ | G10L 17/26 704/231 |
| 2008/0201144 A1* | 8/2008 | Song | .................... | G06V 40/171 704/236 |
| 2014/0201126 A1* | 7/2014 | Zadeh | ..................... | A61B 5/165 706/52 |
| 2015/0350438 A1* | 12/2015 | Arslan | ..................... | G10L 25/93 379/88.01 |
| 2016/0284347 A1* | 9/2016 | Sainath | ................ | G06N 3/0454 |
| 2016/0322055 A1* | 11/2016 | Sainath | ................ | H04R 3/005 |
| 2017/0125020 A1* | 5/2017 | Seo | ........................ | G10L 15/144 |
| 2018/0204111 A1* | 7/2018 | Zadeh | .................. | G06N 3/0454 |
| 2018/0247643 A1* | 8/2018 | Battenberg | .............. | G10L 15/02 |
| 2019/0130896 A1* | 5/2019 | Zhou | ....................... | G10L 15/24 |
| 2019/0130897 A1* | 5/2019 | Zhou | ....................... | G10L 25/51 |
| 2019/0156210 A1* | 5/2019 | He | ....................... | G06N 3/0481 |
| 2019/0251952 A1* | 8/2019 | Arik | ..................... | G10L 13/033 |
| 2019/0259409 A1* | 8/2019 | Variani | ................. | G10L 21/028 |
| 2019/0287142 A1* | 9/2019 | Fan | ..................... | G06Q 30/0627 |
| 2019/0392851 A1* | 12/2019 | Kim | ....................... | G10L 15/22 |
| 2020/0035247 A1* | 1/2020 | Boyadjiev | ............... | G06K 9/627 |
| 2020/0184278 A1* | 6/2020 | Zadeh | .................... | G06F 16/43 |
| 2020/0193972 A1* | 6/2020 | Fei | ........................ | G06N 20/10 |
| 2021/0043222 A1* | 2/2021 | Li | .......................... | G06N 3/084 |
| 2021/0050020 A1* | 2/2021 | Li | ........................... | G10L 17/18 |
| 2021/0272571 A1* | 9/2021 | Balasubramaniam | ...................... | G16H 15/00 |
| 2022/0005493 A1* | 1/2022 | Li | ........................... | G10L 25/78 |

OTHER PUBLICATIONS

Yenigalla et al., "Speech Emotion Recognition Using Spectrogram & Phoneme Embedding", Proc. Interspeech 2018, Sep. 2-6, 2018, pp. 3688-3692, International Speech Communication Association, Hyderabad, India.

* cited by examiner

| HYPER PARAMETER | MEAN | SET VALUE |
|---|---|---|
| $d_{spec}$ | NUMBER OF FEATURE VALUES OF SPECTROGRAM | 384 |
| $d_{cnn}$ | NUMBER OF CONVOLUTION FILTERS | 64 |
| $d_{lstm}$ | NUMBER OF HIDDEN LAYER UNITS OF LSTM | 60 |
| $d_{attn}$ | SIZE OF HIDDEN LAYER IN EACH ATTENTION | 512 |
| $n_{cw}$ | SIZE OF CONVOLUTION WINDOW | 3 |
| $n_{pw}$ | SIZE OF POOLING WINDOW | 3 |
| $n_{attn}$ | NUMBER OF ATTENTION MECHANISMS (HEAD NUMBER) | 8 |

INFORMATION PROCESSING APPARATUS, INFORMATION PROCESSING METHOD, AND STORAGE MEDIUM

CROSS-REFERENCE TO RELATED APPLICATION(S)

This application claims priority to and the benefit of Japanese Patent Application No. 2019-144793 tiled on Aug. 6, 2019, the entire disclosure of which is incorporated herein by reference.

BACKGROUND OF THE INVENTION

Field of the Invention

The present invention relates to an information processing apparatus, an information processing method, and a storage medium.

Description of the Related Art

Conventionally, spoken dialog systems that use natural language processing are known. Commonly, the spoken dialog systems cannot appropriately deal with human emotion, and give a cold or robotic impression. For this reason, speech emotion recognition technology has been studied to realize a more natural dialog system.

The speech emotion recognition technology is mainly constituted by feature extraction and classification technologies. As for the classification technology, in particular, recent advances of deep learning technologies have replaced conventional machine learning methods such as hidden Markov models and support vector machines that have been conventionally used.

In addition, conventionally, low-level descriptors (LLD) that are manually determined have been used in feature extraction. Meanwhile, an end-to-end neural network has been proposed in which a speech spectrogram is input to a neural network that uses deep learning. A. Satt and two others authored "Efficient emotion recognition from speech using deep learning on spectrograms", INTERSPEECH, 2017, pp. 1089-1093 (hereinafter referred to as Non-Patent Document 1), that proposes a technology that improves speech emotion recognition accuracy by directly learning mapping for a speech spectrogram using an end-to-end neural network.

"Efficient emotion recognition from speech using deep learning on spectrograms" discloses a technology for performing speech emotion recognition using a convolutional neural network (also called a CNN), and an LSTM (Long Short Term Memory), which is one type of recurrent neural network (also called an RNN). In this technology, it is envisioned that local and temporal behavior of a speech spectrogram is grasped using the CNN, while temporal behavior of the data is learned using the LSTM.

Emotion in an utterance does not appear in the entire utterance, but appears in a period that is remarkably associated with the emotion in the utterance. For this reason, there is a demand for a technology that enables emotion recognition while focusing on features in the period that is remarkably associated with the emotion in an utterance.

SUMMARY OF THE INVENTION

The present disclosure has been made in consideration of the aforementioned issues, and realizes a technology that enables emotion recognition while focusing on features in a period that is remarkably associated with the emotion, using an end-to-end neural network.

In order to solve the aforementioned problems, one aspect of the present disclosure provides an information processing apparatus comprising: one or more processors; and a memory storing instructions which, when the instructions are executed by the one or more processors, cause the information processing apparatus to function as: an extraction unit configured to extract a plurality of local features from data indicating a speech, wherein characteristics of feature extraction are formed through learning; an encoding unit configured to encode a series of chronological features of the data indicating the speech based on the plurality of local features, wherein characteristics of encoding the series of chronological features are formed through learning; a generation unit configured to generate information obtained by weighting features at a specific point in time associated with emotion classification, of the series of chronological features encoded, wherein characteristics of weighting the features at the specific point in time are formed through learning; and a classification unit configured to classify emotion corresponding to the data indicating the speech using the information obtained by weighting the features at the specific point in time, wherein characteristics of classification are formed through learning.

Another aspect of the present disclosure provides, an information processing method comprising: extracting a plurality of local features from data indicating a speech, wherein characteristics of feature extraction are formed through learning; encoding a series of chronological features of the data indicating the speech based on the plurality of local features, wherein characteristics of encoding the series of chronological features are formed through learning; generating information obtained by weighting features at a specific point in time associated with emotion classification, of the series of chronological features encoded, wherein characteristics of weighting the features at the specific point in time are formed through learning; and classifying emotion corresponding to the data indicating the speech using the information obtained by weighting the features at the specific point in time, wherein characteristics of classification are formed through learning.

Still another aspect of the present disclosure provides, a non-transitory computer-readable storage medium storing a program for causing a computer to function as each unit of an information processing apparatus, the information processing apparatus comprising: an extraction unit configured to extract a plurality of local features from data indicating a speech, wherein characteristics of feature extraction are formed through learning; an encoding unit configured to encode a series of chronological features of the data indicating the speech based on the plurality of local features, wherein characteristics of encoding the series of chronological features are formed through learning; a generation unit configured to generate information obtained by weighting features at a specific point in time associated with emotion classification, of the series of chronological features encoded, wherein characteristics of weighting the features at the specific point in time are formed through learning; and a classification unit configured to classify emotion corresponding to the data indicating the speech using the information obtained by weighting the features at the specific point in time, wherein characteristics of classification are formed through learning.

Yet still another aspect of the present disclosure provides, a non-transitory computer-readable storage medium storing a recognition model performed by an information processing apparatus, the recognition model comprising: a first layer that performs convolution on an input value that is data indicating a speech, and makes output; a second layer that extracts time-series features of the data indicating the speech with an output value of the first layer as an input value, and makes output; a third layer that generates information obtained by weighting features at a specific point in time associated with emotion classification in an output value of the second layer by using self-attention, with the output value of the second layer as an input value, and makes output; and an output layer that outputs values indicating probabilities of emotion and gender based on an output value of the third layer.

According to the present invention, emotion can be recognized while focusing on features in a period that is remarkably associated with the emotion, using an end-to-end neural network.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Configuration of Information Processing Apparatus

Figure 1:
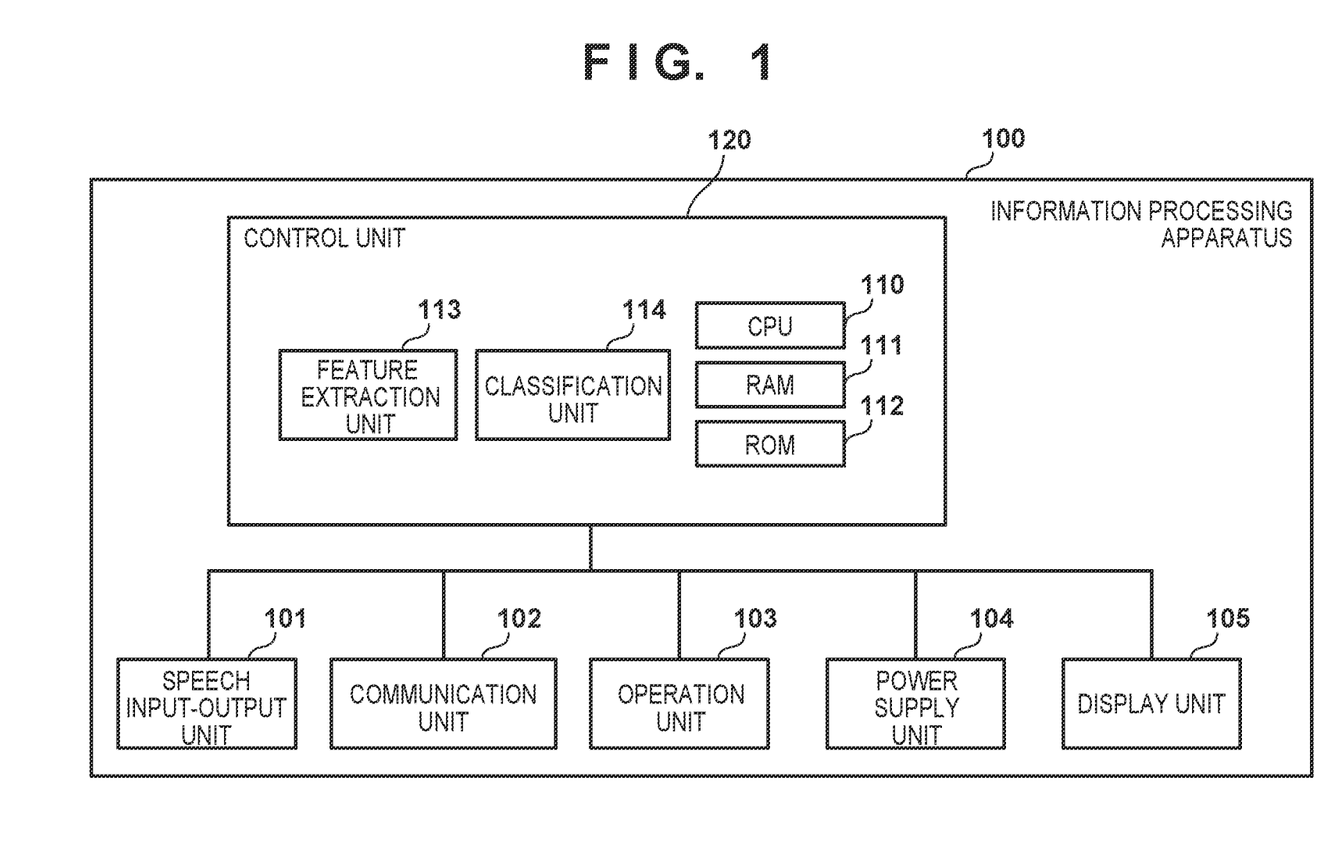
FIG. 1 is a block diagram showing an example functional configuration of an information processing apparatus according to an embodiment of the present invention.

A configuration of an information processing apparatus 100 according to the present embodiment will be described with reference to FIG. 1. Although the present embodiment will describe, as an example, the case where the information processing apparatus is a personal computer, the invention is not limited thereto. For example, the information processing apparatus may alternatively be an information processing server that is arranged in a data center or the like, or may be a mobile phone such as a smartphone, a tablet terminal, an information processing unit arranged in a vehicle, a medical device, or the like.

The functional blocks described with reference to the subsequent diagrams may be integrated or separated, and later-described functions may be realized by separate blocks. Functions described as hardware may be realized by software, and vice versa.

A speech input-output unit 101 includes, for example, a microphone and a speaker, obtains speech data that is subjected to speech emotion recognition processing (also referred to simply as speech data), and outputs sound that is reproduced by a control unit 120.

The communication unit 102 is a communication device that includes, for example, a communication circuit or the like, and communicates with external devices through wired communication or wireless communication (e.g. mobile communications that are standardized as LTE, LTE-Advanced, or so-called 5G). The communication unit 102 can obtain various data from an external server (not shown). For example, the communication unit 102 can obtain learning data for speech emotion recognition processing from this external server.

An operation unit 103 includes operation members such as a keyboard and a mouse, as well as buttons and a touch panel provided on the information processing apparatus, for example. A power supply unit 104 supplies electric power obtained from the outside to each part of the information processing apparatus. For example, the power supply unit 104 may also include a battery that is constituted by a lithium-ion battery or the like. A display unit 105 is a display device for displaying an operation screen for operating the information processing apparatus, and processing results.

The control unit 120 includes a CPU 110, a RAM 111, a ROM 112, a feature extraction unit 113, and a classification unit 114. The feature extraction unit 113 and the classification unit 114 realizes feature extraction and classification for performing speech emotion recognition processing by using an end-to-end (E2E) neural network. The present embodiment will describe, as an example, the case of realizing functions of the E2E neural network using two functional configurations, namely the feature extraction unit 113 and the classification unit 114. However, the feature extraction unit 113 and the classification unit 114 may be realized by one, or three or more integrated or separate functional configurations.

The CPU 110 includes one or more processors, operates each part of the control unit 120 and controls the entire information processing apparatus 100 by loading a computer program stored in the ROM 112 to the RAM 111 and executing this program.

The RAM 111 includes, for example, a DRAM or the like, and functions as a work memory for the CPU 110. The ROM 112 is constituted by a nonvolatile storage medium, and stores computer programs that are to be executed by the CPU 110, set values for operating the control unit 120, and so on. Note that the following embodiment will describe, as an example, the case where the CPU 110 performs processing of the feature extraction unit 113 and the classification unit 114. However, processing of the feature extraction unit 113 and the classification unit 114 may alternatively be performed by one or more other processors (e.g. a GPU) (not shown).

The feature extraction unit 113, upon speech data (including learning data) to be used in speech emotion recognition processing being input thereto, extracts features of the input data, and outputs the data (feature data) obtained after extracting features to the classification unit 114. More specifically, the feature extraction unit 113 extracts a spectrogram from the speech data, and then outputs feature data obtained by extracting a plurality of local features of the speech data by performing convolutional processing and pooling processing using a CNN (Convolutional Neural Network) on the spectrogram. Since the feature extraction unit 113 uses the CNN, characteristics of feature extraction are formed through learning with the neural network using the CNN. Processing performed by the feature extraction unit 113 will be described later.

The classification unit 114 performs a plurality of sets of classification processing for classifying emotion and gender, using the feature data output from the feature extraction unit 113. The classification unit 114 is constituted by a neural network that has three hierarchical structures, for example. Although the details will be described later, the classification unit 114 includes, for example, (i) a layer that has a bidirectional LSTM configuration, (ii) a layer that has an attention mechanism, and (iii) a layer that classifies and outputs emotion and gender corresponding to speech data.

Data Used in Speech Emotion Recognition Processing

Figure 2:
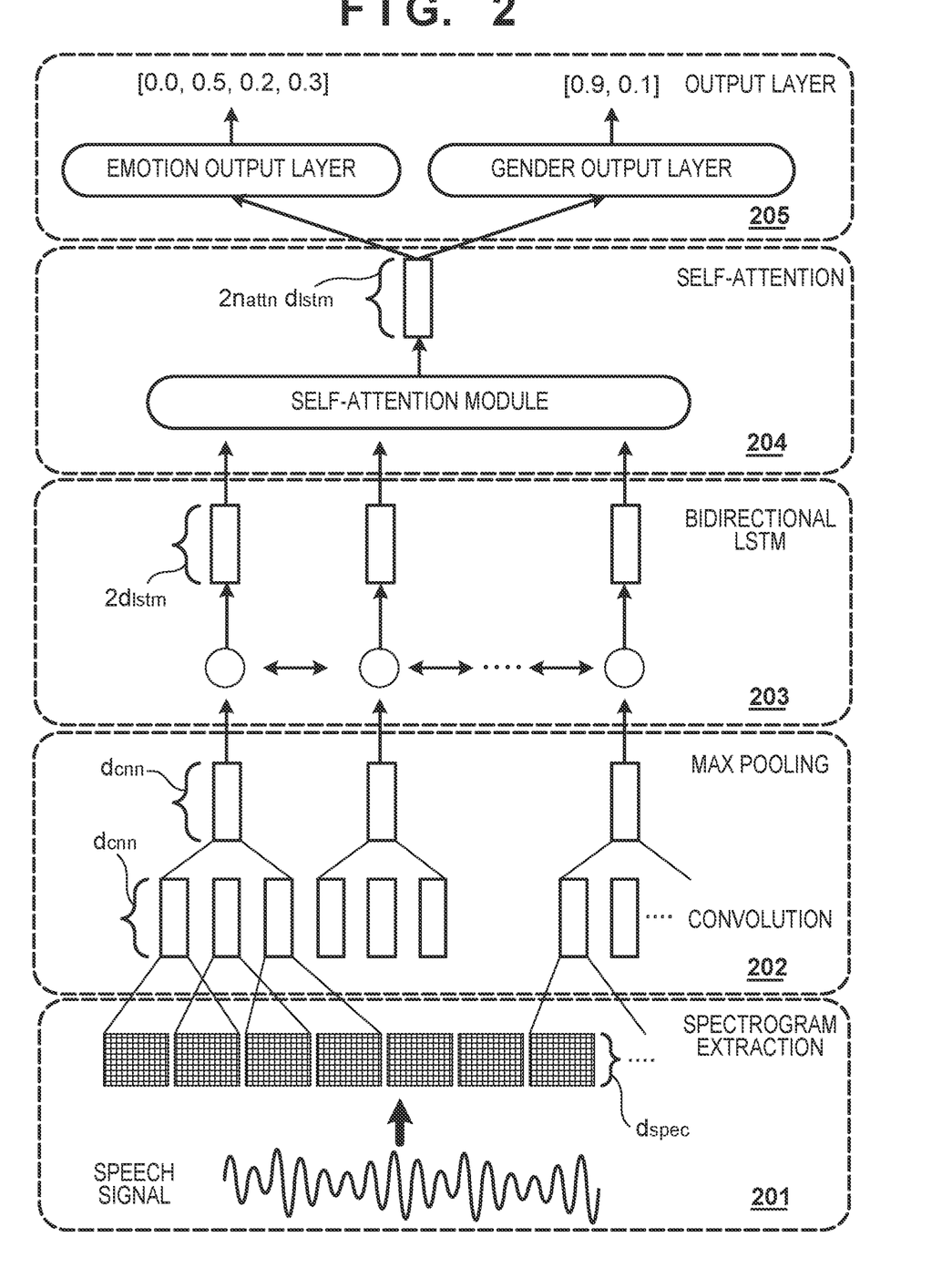
FIG. 2 is a diagram illustrating an example configuration of a speech emotion recognition model according to the present embodiment.

A model for the speech emotion recognition processing according to the present embodiment (referred to simply as a speech emotion recognition model), which will be described later with reference to FIG. 2, can use, for example, speech data for speech emotion recognition processing that is known as an IEMOCAP database. This speech data includes multimodal communication in a two-person session conducted by 10 subjects (five males and five females). This data substantially includes a 12-hour speech, and is labeled with an emotion category selected from "anger", "boredom", "excitement", "fear", "irritation", "happiness", "neutral", "sadness", "surprise", and "other" (i.e. is assigned correct answer data). For example, around 5500 utterances can be used in this database.

Configuration of Speech Emotion Recognition Model

Figure 3:
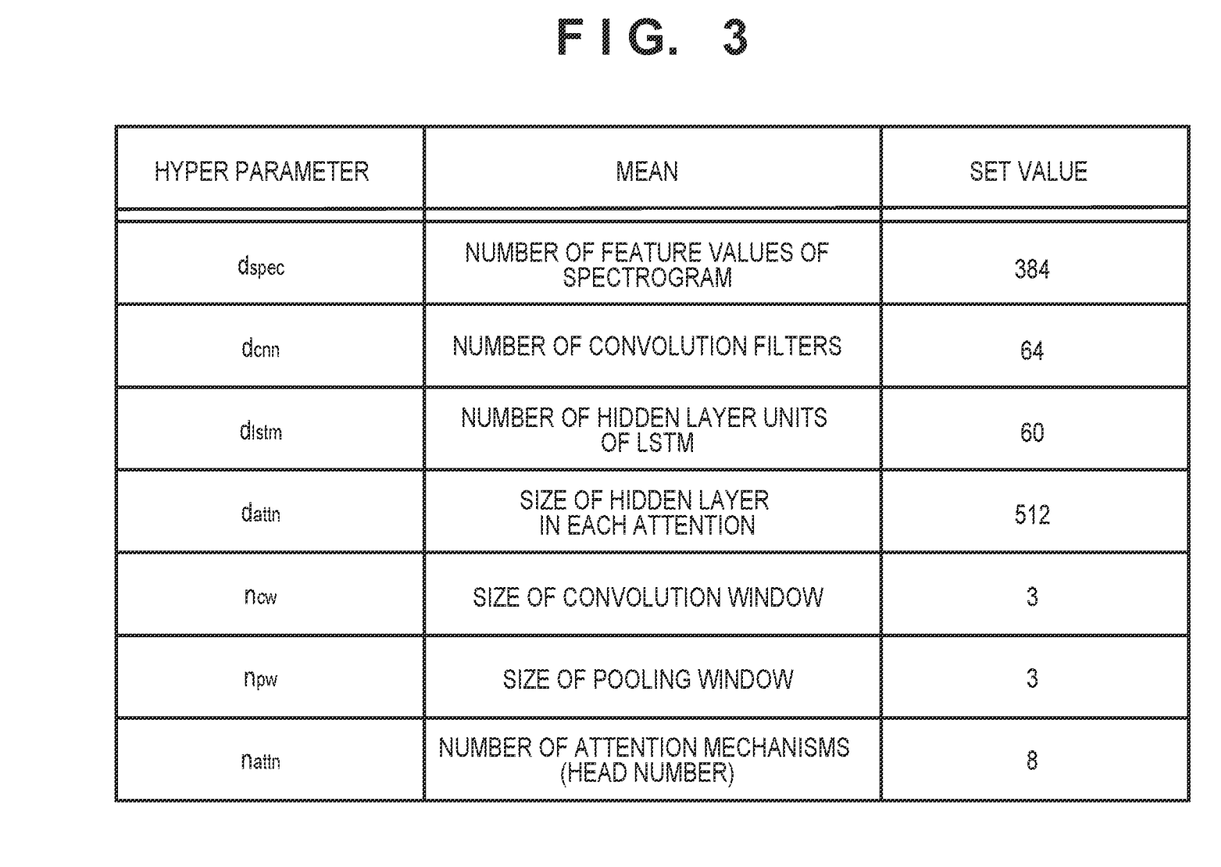
FIG. 3 is a diagram showing examples of hyper parameters used in a speech emotion recognition model according to the present embodiment.

Next, a configuration of the speech emotion recognition model according to the present embodiment will be described with reference to FIG. 2. The speech emotion recognition model according to the present embodiment is constituted by roughly five functional layers. First, the five layers include a layer 201 for extracting a spectrogram from speech data, and a layer 202 for performing convolution and pooling processing on the spectrogram. Furthermore, the five layers also include a layer 203 for performing processing using the bidirectional LSTM on feature data output from the layer 202, a layer 204 for performing processing using an attention mechanism, and a layer 205 for classifying emotion and gender and outputting the classification results. Here, four layers, namely the layers 202 to 205 are constituted by a (E2E) neural network. FIG. 3 shows specific examples of hyper parameters, such as the number of dimensions and window size, which are used in the neural network that will be described later with reference to FIG. 2.

Spectrogram Extraction

The layer 201 extracts a spectrogram from speech data. The maximum length of an utterance is set to 7.5 seconds. The feature extraction unit 113 performs preprocessing to divide a longer utterance into 7.5-second utterances and fill a blank portion of a shorter utterance with 0.

The feature extraction unit 113 applies, for example, a Hanning window with a length of 800 to the speech data, and samples, for example, the speech data at 16000 Hz. The feature extraction unit 113 calculates, for each frame, short-time Fourier transform with a hop size of 400 and a length of 800, for example, and maps the calculated spectrogram onto a spectrogram on the mel scale. In the present embodiment, to extract more personalized features, a delta feature value and a delta-delta feature value are extracted from the spectrogram on the mel scale.

CNN-BLSTM Using Self-attention

The layers 202 to layer 204 constitute a CNN-BLSTM that uses self-attention. The CNN-BLSTM that uses self-attention is mainly constituted by two convolutional neural networks (CNNs) (i.e. two layers 202), two bidirectional LSTMs (BLSTMs) (i.e. two layers 203), and a self-attention network (i.e. layer 204).

A spectrogram of a speech segment extracted in the previous layer will be expressed as X, as shown below.

$$X=\{x_1, x_2, \ldots, x_i\}, x_i \in R^{d_{spec}}$$ [Math 1]

L denotes the temporal length of the spectrogram, and $d_{spec}$ denotes the dimension of a feature vector of the spectrogram. In the CNN-BLSTM that uses self-attention, the spectrogram X is encoded as a fixed-length vector z. Then, classification is performed on z(in the output layer).

First, the layer 202 (i.e. the layer that has a structure of a CNN and a max pooling) will be described. In the layer 202, the feature extraction unit 113 applies convolution and max pooling processing to the spectrogram X.

The CNN generates a sequence $H^{cnn}$ of a vector obtained by integrating local context of the speech data by applying, to X, convolutional processing with a predetermined window size ($n_{cw}$) and a stride of 1. Here, $d_{cnn}$ denotes the number of convolution filters (i.e. feature extraction can be performed for as many different features as the value of $d_{cnn}$). Any known method can be used in convolutional processing, and the details thereof will be omitted accordingly.

$$H^{cnn}=\{h_1^{cnn}, h_2^{cnn}, \ldots, h_L^{cnn}\}, h_i^{cnn} \in R^{d_{cnn}}$$ [Math 2]

jth element of the vector sequence expressed as Math 2 is an inner product of a jth filter and an ith window in X, and is expressed as follows. Note that a function f may be an activation function such as a ReLU, for example.

$$h_{i,j}^{cnn}=f(b_j^{cnn}>W_j^{cnn}, win(X, i, n_{cw})<)$$ [Math 3]

$W_j^{cnn}$, $b_j^{cnn}$: training parameter for a jth convolution filter
win(X, i, $n_{cw}$): ith window whose window size in X is $n_{cw}$ As is understood from the equation shown as Math 3, in the CNN, the training parameter for the filters is optimized through learning with the neural network, and thus, characteristics of feature extraction (filters) for extracting features from the spectrogram are formed through the learning. That is to say, by employing a configuration in which an extracted spectrogram is directly input to the CNN, it is possible to dynamically optimize the characteristics of the filters and configure filters suitable for extracting the features of the spectrogram. Thus, emotion recognition can be more accurately performed than with a feature extraction method that uses a conventional LLD.

Furthermore, the feature extraction unit 113 applies max pooling processing to all outputs from convolutional processing. Any known technique can be used in max pooling processing. Max pooling processing is processing for only taking out a signal with the highest signal value out of data within a window with a predetermined size (e.g. $n_{cw}$) while moving the window with a stride (e.g. $n_{pw}$). Thus, the data volume can be reduced while maintaining feature information.

By thus performing processing in the layers 201 and 2012, it is possible to increase the operation speed of the BLSTM while extracting local features of the speech data and providing the features of the speech data to the BLSTM, which is the next layer.

Next, the layer 203 (i.e. the layer that has a BLSTM configuration) will be described. The classification unit 114 encodes the entire context (i.e. a series of chronological features) of a speech sequence by recurrently updating the state of a hidden layer, using a BLSTM network. This layer receives input from the aforementioned pooling layer, and outputs a sequence of hidden states (information indicating the entire context of the speech sequence). The sequence $H^{blstm}$ of the hidden states is expressed as follows.

$$H^{blstm} = \{h_1^{blstm}, h_2^{blstm}, \ldots, h_{L/n_{pv}}^{blstm}\},$$
$$h_i^{blstm} \in R^{2d_{lstm}} \quad \text{[Math 4]}$$

$h_i^{blstm}$: Connection between an ith forward hidden state and an ith backward hidden state Next, the layer 204 (i.e. the layer that has a self-attention configuration) will be described. The classification unit 114 uses the self-attention network to accumulate information from the BLSTM hidden state $H^{blstm}$ and generate a fixed-length vector z as data obtained by encoding a speech segment.

Upon inputting the hidden state $H^{blstm}$, the self-attention network calculates a weight vector a of the attention as follows. Here, $h^{attn}$ denotes a weighted sum of the hidden states.

$$a = \text{softmax}(w_{s2} \tanh(W_{s1} H^{blstm^T}))$$

$$h^{attn} a H^{blstm}$$

$$W_{s1} \in R^{d_{attn} \times 2d_{lstm}}, w_{s2} \in R^{d_{attn}}: \text{Training parameter} \quad \text{[Math 5]}$$

That is to say, in an attention mechanism, information at which position (chronologically, information at which point in time) is to be encoded to the vector z for the later classification, of the information that has been encoded to the hidden state, can be determined through learning.

The combination of hidden states generated by the weight vector a of the attention in the hidden states only grasps a single specific aspect of the input data. For this reason, to obtain general expression and features of the input data, the classification unit 114 uses $n_{attn}$ multi-head self-attention mechanisms. Thus, an ultimate encoding vector z can be obtained by calculating a plurality of combinations of the hidden states $H^{blstm}$ and connecting the calculated combinations.

$$a_j = \text{softmax}(w_{s2,j} \tanh(W_{s1} H^{blstm^T}))$$

$$h_j^{attn} = a_j H^{blstm}$$

$$z = h_1^{attn} \oplus h_2^{attn} \oplus \ldots \oplus h_{n_{att}}^{attn}$$

$$z \in R^{2n_{attn}d_{lstm}}: \text{Training parameter} \quad \text{[Math 6]}$$

Output Using Multi-Task Learning

The layer 205 is an output layer that uses multi-task learning, and generates a probability distribution associated with emotion classification and a probability distribution associated with gender classification.

Gender classification is used to give consideration to the relationship between these two tasks (emotion classification and gender classification), and is used to accurately classify emotion using a multi-task learning method.

The emotion classification and gender classification are constituted by separate neural networks with fully connected layers. In the emotion classification according to the present embodiment, the input data is classified under one of four emotion categories (anger, happiness, neutral, and sadness). In the gender classification, the input data is classified under either of two gender categories, for example. For example, a softmax function can be used as an activation function for each of the neural networks.

The model of these neural networks is optimized by the following objective function.

$$L = \alpha \times L_{emotion} + \beta \times L_{gender} \quad \text{[Math 7]}$$

Here, $L_{emotion}$ denotes a loss of the emotion classification, and $L_{gender}$ denotes a loss of the gender classification.

$\alpha$ and $\beta$ denote the weights of the two tasks. For example, in the present embodiment, $\alpha$ and $\beta$ can be set to 1.0 as an empirical value that increased emotion classification accuracy.

Series of Operations of Learning Using Speech Emotion Recognition Model

Figure 4:
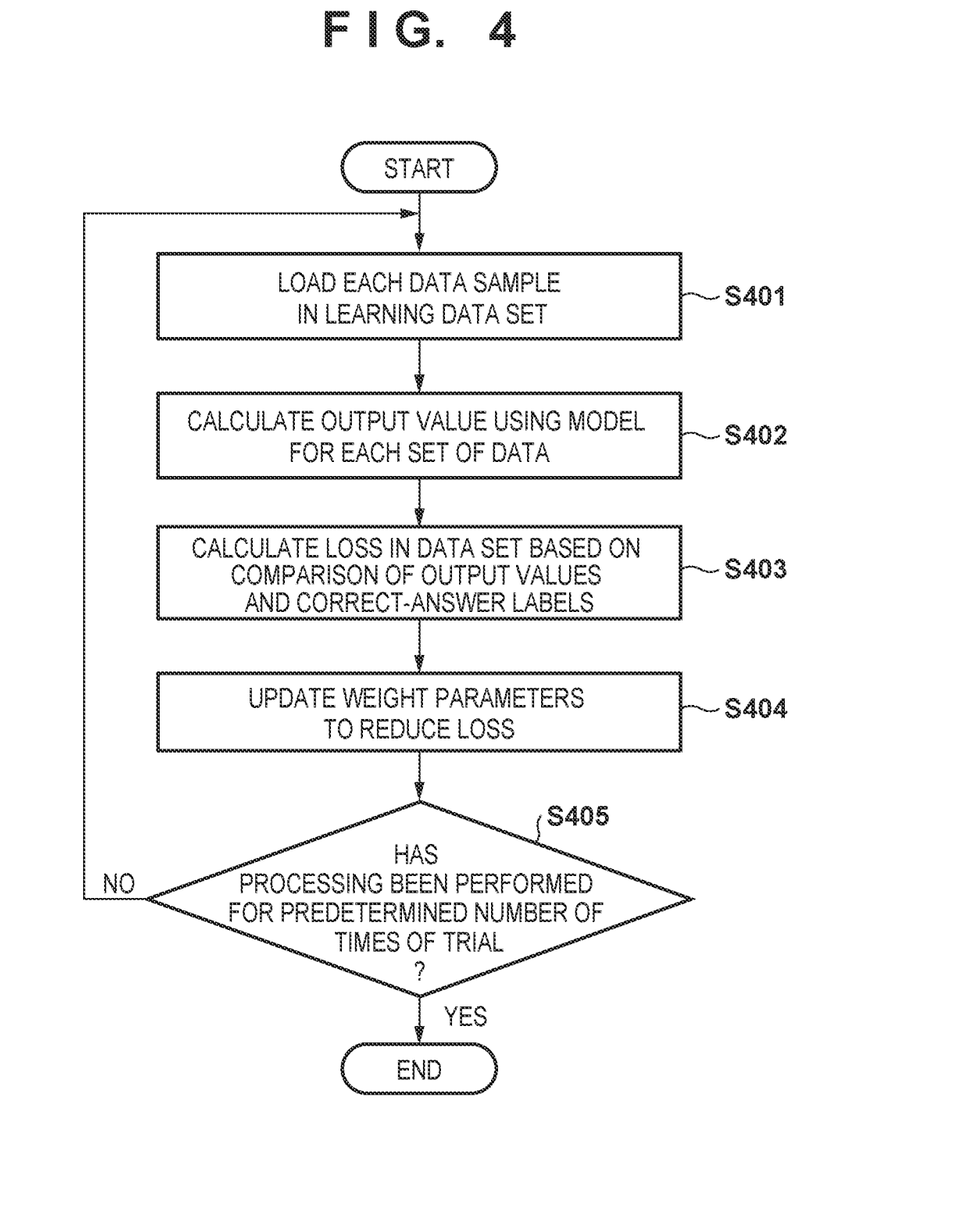
FIG. 4 is a flowchart showing a series of operations of learning using the speech emotion recognition model according to the present embodiment.

Next, a series of operations of learning using the speech emotion recognition model according to the present embodiment will be described with reference to FIG. 4. Note that this processing is realized by the CPU 110 of the control unit 120 loading a program stored in the ROM 112 to the RAM 111 and executing the loaded program, for example. Although this processing is realized by the feature extraction unit 113 and the classification unit 114 operating, the operations of these units will be described collectively as operations of the control unit 120 in the following description.

In the present embodiment, for example, the learning data set is a predetermined number of (e.g. 5500) sets of speech data in the aforementioned IEMOCAP database, and each data sample is an utterance of 7.5 seconds in this data set.

In step S401, the control unit 120 loads each data sample in the learning data set. That is to say, the control unit 120 loads 7.5-second utterance data in the learning data set as each data sample. Note that the control unit 120 initializes a weighting parameter of the neural network in the model before loading the first data sample.

In step S402, the control unit calculates an output value using the speech emotion recognition model for each set of data (e.g. 7.5-second utterance data). The detailed operation of this step will be described later with reference to FIG. 5. The control unit 120 outputs, as an output value, the emotion classification result and the gender classification result from the output layer.

In step S403, the control unit 120 compares the output values obtained using the model and correct-answer values (correct-answer labels assigned to each data sample in the learning data set), and calculates a loss based on the comparison result. In the present embodiment, a loss L is calculated by, for example, applying the result of the comparison with the data samples to the equation shown as Math 7.

In step S404, the control unit 120 updates weight parameters of the neural network so as to reduce the loss obtained in step S403. For example, the control unit 120 updates each of the weight parameters of the neural network in the model, using a derivative of the loss L and a known technique called back propagation.

In step S405, the control unit 120 determines whether or not the processing in steps S401 to S404 has been performed for a predetermined number of times of trial. That is to say, the control unit 120 determines whether or not the processing in steps S401 to S404 has been repeatedly performed on the learning data set for a predetermined number of times of trial to perform learning. This number of times of trial is also called an epoch number, if it is determined that the processing has been performed for a predetermined number of times of trial, the control unit 120 ends this series of operations. On the other hand, if it is determined that the processing has not been performed for a scheduled number of times of trial, the control unit 120 returns the processing to step S401 and repeat the processing.

Series of Operations of Speech Emotion Recognition Processing

Figure 5:
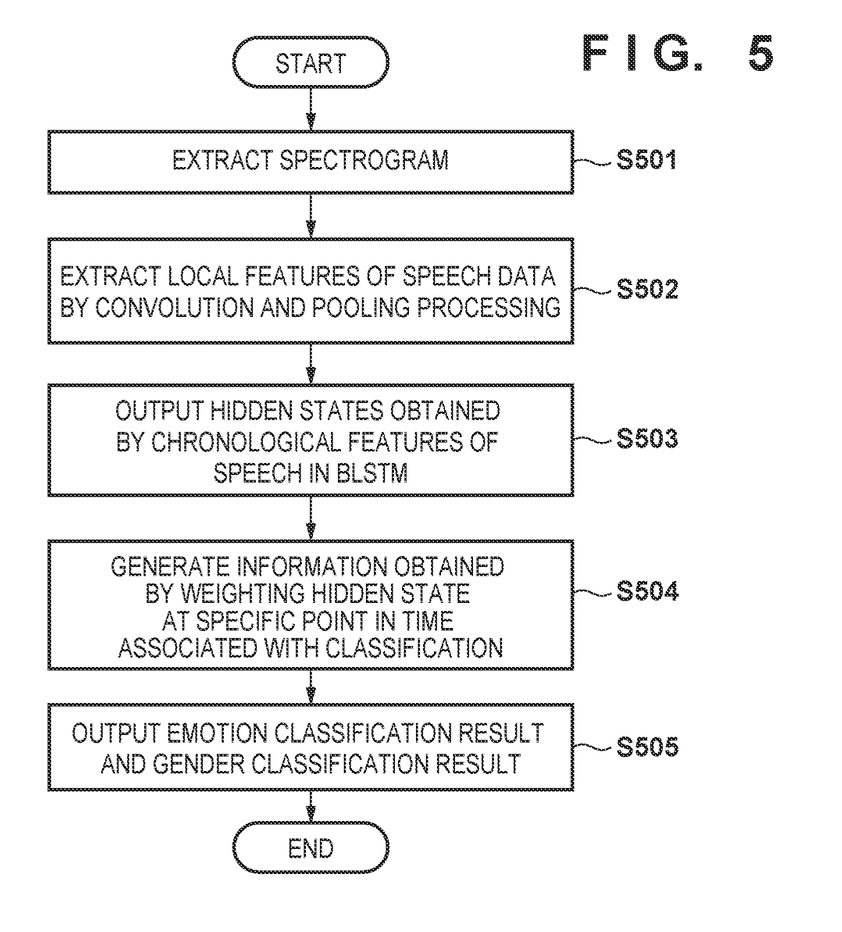
FIG. 5 is a flowchart showing a series of operations in speech emotion recognition processing according to the present embodiment.

Furthermore, a series of operations of speech emotion recognition processing according to the present embodiment will be described with reference to FIG. 5. Note that this processing is initiated when step S402 is performed.

In step S501, the control unit 120 extracts a spectrogram from the speech data of the data sample in accordance with processing described regarding the layer 201. That is to say, for example, the control unit 120 calculates short-time Fourier transform of the sampled data, and performs processing to map the calculated spectrogram onto the spectrogram on the mel scale.

In step S502, the control unit 120 applies, to the extracted spectrogram, convolution and pooling processing described regarding the layer 202, and extracts features of the speech data. Then, the control unit 120 outputs the extracted features as feature data.

In step S503, the control unit 120 performs processing using the BLSTM described regarding the layer 203, and outputs the hidden states (information obtained by encoding chronological features of the speech) in the BLSTM.

In step S504, the control unit 120 uses the attention mechanism to calculate an output obtained by weighting the hidden state at a specific point in time, with respect to the chronological hidden states output by the BLSTM.

In step S505, the control unit 120 performs processing with the emotion output layer and processing with the gender output layer described regarding the layer 205, and outputs the emotion classification result and the gender classification result. At this time, the emotion classification result indicates a probability distribution regarding the emotion that may be, for example, classified as [0.0, 0.5, 0.2, 0.3] with respect to "anger", "happiness", "neutral", and "sadness". The gender classification result indicates a probability distribution regarding the gender that may be, for example, classified as [0.9, 0.1] with respect to "male" and "female".

After outputting the emotion classification result and the gender classification result, the control unit 120 ends this processing.

Series of Operations After Learning Using Speech Emotion Recognition Model

Figure 6:
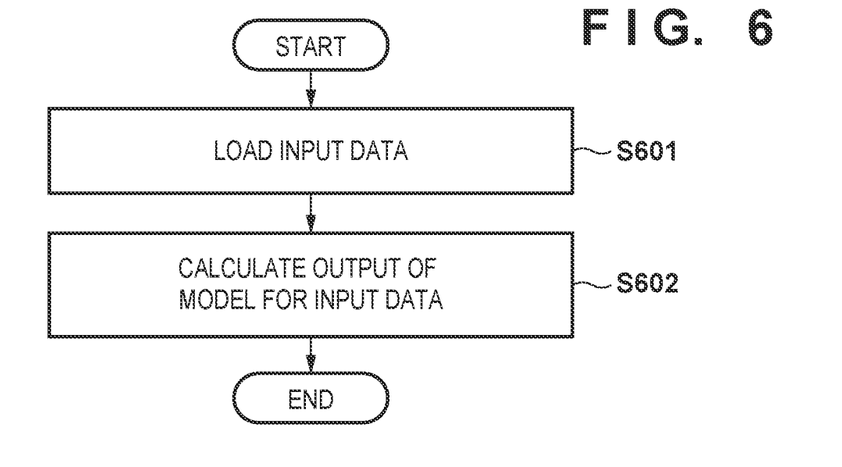
FIG. 6 is a flowchart showing a series of operations after the learning using the speech emotion recognition model according to the present embodiment.

Next, a series of operations performed after the learning using the speech emotion recognition model according to the present embodiment will be described with reference to FIG. 6. This processing is processing performed with the teaming of the model finished. In the speech emotion recognition processing, the processing in the layers formed through learning is performed on speech data to which a correct-answer label is not assigned, and an emotion classification result and a gender classification result that are estimated from this speech data are output.

Note that, for example, this processing is realized by the CPU 110 of the control unit 120 loading a program stored in the ROM 112 to the RAM 111 and executing the loaded program, similar to the speech emotion recognition processing during learning. Although this processing is realized by the feature extraction unit 113 and the classification unit 114 operating, the operations of these units will be described collectively as operations of the control unit 120 in the following description.

In step S601, the control unit 120 loads a single set of speech data to which a correct-answer label is not assigned. The input speech data is speech data of 7.5 seconds, which is the same time length as that of the speech data used during learning.

In step S602, an output of the speech emotion recognition model is calculated with respect to the input data. That is to say, processing in steps S501 to S505 shown FIG. 5 is performed, and the emotion classification result and the gender classification result for the loaded speech data are output. After outputting the classification results, the control unit 120 ends this processing.

Superiority of Speech Emotion Recognition Model According to the Present Embodiment As a result of evaluating the performance of the speech emotion recognition model according to the present embodiment using data of the IEMOCAP database, the performance of the speech emotion recognition model according to the present embodiment surpassed the performed achieved by the conventional technologies. In the performance evaluation, both the weighted accuracy (WA) and the unweighted accuracy (UWA) are measured and compared. The weighted accuracy represents the overall accuracy for all sets of test data, and the unweighted accuracy represents the average of the accuracy in each emotion category.

As a result of using the speech emotion recognition model according to the present embodiment, the weighted accuracy was 81.6%, and the unweighted accuracy was 82.8%.

In contrast, for example, with the technology by which speech emotion recognition is performed by using a combination of a CNN and a BLSTM disclosed in Non-Patent Document 1, the weighted accuracy was 68.8%, and the unweighted accuracy was 59.4%.

P. Yenigalla and five others authored "Speech emotion recognition using spectrogram & phoneme embedding" Proc. Interspeech 2018, pp. 3688-3692, 2018, which describes a technology that exhibits high performance. With the technology described in this document, which uses a multi-channel CNN, the weighted accuracy was 73.9%, and the unweighted accuracy was 68.5%.

That is to say, it can be understood that performance that cannot be achieved with the conventional technologies can be obtained in the case of using the speech emotion recognition model according to the present embodiment.

Modifications

The above example has described the case where the attention mechanism is a multi-head self-attention mechanism. However, the attention mechanism need not be multi-head, and a configuration that uses an encoder/decoder model that is not self-attentive may alternatively be employed.

In the above example, a bidirectional LSTM is used in the first part of the attention mechanism. However, the bidirectional LSTM may alternatively be a bidirectional recurrent neural network.

Furthermore, in the above example, gender classification as well as emotion classification are performed, as an example of multi-task learning. However, any classification other than gender classification that is deeply associated with emotion classification may be performed, and other classification may also be performed in addition to emotion and gender classification.

In the above example, both the number of layers that use a CNN and the number of layers that uses a bidirectional LSTM are two, but the numbers of these layers are not limited thereto.

Summary of Embodiment

1. An information processing apparatus according to the above embodiment includes:

an extraction unit (e.g. 113, 202, S502) configured to extract a plurality of local features from data indicating a speech, wherein characteristics of feature extraction are formed through learning;

an encoding unit (e.g. 114, 203, S503) configured to encode a series of chronological features of the data indicating the speech based on the plurality of local features, wherein characteristics of encoding the series of chronological features are formed through learning;

a generation unit (e.g. 114, 204, S504) configured to generate information obtained by weighting features at a specific point in time associated with emotion classification, of the series of chronological features encoded, wherein characteristics of weighting the features at the specific point in time are formed through learning; and a classification unit (e.g. 114, 205, S505) configured to classify emotion corresponding to the data indicating the speech using the information obtained by weighting the features at the specific point in time, wherein characteristics of classification are formed through learning.

According to the present embodiment, it is possible to recognize emotion while focusing on features in a period that is remarkably associated with the emotion, using an end-to-end neural network.

In the information processing apparatus according to the above embodiment, the classification unit further classifies gender corresponding to the data indicating the speech using the information obtained by weighting the features at the specific point in time.

According to the present embodiment, the accuracy of emotion recognition can be increased by taking differences between males and females in signals into consideration in the learning.

3. In the information processing apparatus according to the above embodiment, the classification unit further outputs values indicating probabilities of the classified emotion and gender.

According to the present embodiment, processing corresponding to the probability of the classification results can be further performed.

4. In the information processing apparatus according to the above embodiment, the values indicating the probabilities are expressed by probability distributions.

According to the present embodiment, processing that is based on the probability obtained for each target that may be classified can be further performed.

5. In the information processing apparatus according to the above embodiment, the extraction unit performs convolutional processing on the data indicating the speech (e.g. 202).

According to the present embodiment, local features corresponding to the position of data indicating a speech can be extracted.

6. In the information processing apparatus according to the above embodiment, each of the units is realized in a form of a neural network.

According to the present embodiment, high-dimensional and complex features can be readily dealt with.

7. In the information processing apparatus according to the above embodiment, the encoding unit is realized in a form of a neural network that uses a bidirectional Long Short Term Memory (LSTM) (e.g. 203).

According to the present embodiment, it is possible to address the vanishing gradient problem and perform recognition processing on time-series data that has a relatively long-term dependency relationship.

8. In the information processing apparatus according to the above embodiment, the generation unit is realized in a form of a neural network that uses a self-attention mechanism.

According to the present embodiment, features of speech data in a period that is remarkably associated with emotion can be more readily dealt with.

9. In the information processing apparatus according to the above embodiment, the data indicating the speech is a spectrogram of the speech.

According to the present embodiment, features can be spatially extracted in feature extraction in the latter stage, and a CNN can be readily applied.

10. In the information processing apparatus according to the above embodiment, the data indicating the speech is a plurality of spectrograms obtained by dividing the spectrogram of the speech by a predetermined interval.

11. An information processing method according to the above embodiment extracting (e.g. S502) a plurality of local features from data indicating a speech, wherein characteristics of feature extraction are formed through learning;

encoding (e.g. S503) a series of chronological features of the data indicating the speech based on the plurality of local features, wherein characteristics of encoding the series of chronological features are formed through learning;

generating (S504) information obtained by weighting features at a specific point in time associated with emotion classification, of the series of chronological features encoded, wherein characteristics of weighting the features at the specific point in time are formed through learning; and classifying (S505) emotion corresponding to the data indicating the speech using the information obtained by weighting the features at the specific point in time, wherein characteristics of classification are formed through learning.

According to the present embodiment, it is possible to recognize emotion while focusing on features in a period that is remarkably associated with the emotion, using an end-to-end neural network.

12. A non-transitory computer-readable storage medium according to the above embodiment is a storage medium storing a program for causing a computer to function as each unit of an information processing apparatus, the information processing apparatus including:

an extraction unit (e.g. 113, 202, S502) configured to extract a plurality of local features from data indicating a speech, wherein characteristics of feature extraction are formed through learning;

an encoding unit (e.g. 114, 203, S503) configured to encode a series of chronological features of the data indicating the speech based on the plurality of local features, wherein characteristics of encoding the series of chronological features are formed through learning;

a generation unit (e.g. 114, 204, S504) configured to generate information obtained by weighting features at a specific point in time associated with emotion classification, of the series of chronological features encoded, wherein characteristics of weighting the features at the specific point in time are formed through learning; and a classification unit (e.g. 114, 205, S505) configured to classify emotion corresponding to the data indicating the speech using the information obtained by weighting the features at the specific point in time, wherein characteristics of classification are formed through learning.

According to the present embodiment, it is possible to recognize emotion while focusing on features in a period that is remarkably associated with the emotion, using an end-to-end neural network.

13. A non-transitory computer-readable storage medium according to the above embodiment is a storage medium storing a recognition model to be performed by an information processing apparatus, the recognition model including:

a first layer (e.g. 202) that performs convolution on an input value that is data indicating a speech, and makes output;

a second layer (e.g. 203) that extracts time-series features of the data indicating the speech with an output value of the first layer as an input value, and makes output;

a third layer (e.g. 204) that generates information obtained by weighting features at a specific point in time associated with emotion classification in an output value of the second layer by using self-attention, with the output value of the second layer as an input value, and makes output; and an output layer (e.g. 205) that outputs values indicating probabilities of emotion and gender based on an output value of the third layer.

According to the present embodiment, it is possible to recognize emotion while focusing on features in a period that is remarkably associated with the emotion, using an end-to-end neural network.

The invention is not limited to the foregoing embodiments, and various variations/changes are possible within the spirit of the invention.

What is claimed is:

1. An information processing apparatus comprising:
one or more processors; and
a memory storing instructions which, when the instructions are executed by the one or more processors, cause the information processing apparatus to function as:
an extraction unit configured to extract a plurality of features from data indicating a speech, wherein each of the plurality of features corresponds to a divided portion of the data indicating the speech, and wherein the extraction unit is realized in a form of a neural network;
an encoding unit configured to encode a series of chronological features of the data indicating the speech based on the plurality of features, wherein the encoding unit is realized in a form of a neural network;
a generation unit configured to generate information obtained by weighting features at a specific point in time associated with emotion classification, of the series of chronological features encoded, wherein the generation unit is realized in a form of a neural network; and
a classification unit configured to classify emotion and gender corresponding to the data indicating the speech using the information obtained by weighting the features at the specific point in time, wherein the classification unit comprises a neural network for the classification of emotion and a neural network for the classification of gender, the neural network for the classification of emotion and the neural network for the classification of gender being optimized through learning using an objective function which is calculated using a loss of the classification of emotion and a loss of the classification of gender.

2. The information processing apparatus according to claim 1, wherein the classification unit further outputs values indicating probabilities of the classified emotion and gender.

3. The information processing apparatus according to claim 2, wherein the values indicating the probabilities are expressed by probability distributions.

4. The information processing apparatus according to claim 1, wherein the extraction unit performs convolutional processing on the data indicating the speech.

5. The information processing apparatus according to claim 1, wherein the encoding unit is realized in a form of a neural network that uses a bidirectional Long Short Term Memory (LSTM).

6. The information processing apparatus according to claim 1, wherein the generation unit is realized in a form of a neural network that uses a self-attention mechanism.

7. The information processing apparatus according to claim 1, wherein the data indicating the speech is a spectrogram of the speech.

8. The information processing apparatus according to claim 7, wherein the data indicating the speech is a plurality of spectrograms obtained by dividing the spectrogram of the speech by a predetermined interval.

9. An information processing method comprising:
extracting a plurality of features from data indicating a speech, wherein each of the plurality of features corresponds to a divided portion of the data indicating the speech, and wherein the extracting the plurality of features is performed using a neural network;
encoding a series of chronological features of the data indicating the speech based on the plurality of features, wherein the encoding a series of chronological features of the data is performed using a neural network;
generating information obtained by weighting features at a specific point in time associated with emotion classification, of the series of chronological features encoded, wherein the generating information is performed using a neural network; and
classifying emotion and gender corresponding to the data indicating the speech using the information obtained by weighting the features at the specific point in time, wherein the classifying emotion and gender is performed using a neural network for the classification of emotion and a neural network for the classification of gender, the neural network for the classification of emotion and the neural network for the classification of gender being optimized through learning using an objective function which is calculated using a loss of the classification of emotion and a loss of the classification of gender.

10. A non-transitory computer-readable storage medium storing a program for causing a computer to function as each unit of an information processing apparatus, the information processing apparatus comprising:
an extraction unit configured to extract a plurality of features from data indicating a speech, wherein each of the plurality of features corresponds to a divided portion of the data indicating the speech, and wherein the extraction unit is realized in a form of a neural network;
an encoding unit configured to encode a series of chronological features of the data indicating the speech based on the plurality of features, wherein the encoding unit is realized in a form of a neural network;
a generation unit configured to generate information obtained by weighting features at a specific point in time associated with emotion classification, of the series of chronological features encoded, wherein the generation unit is realized in a form of a neural network; and a classification unit configured to classify emotion and gender corresponding to the data indicating the speech using the information obtained by weighting the features at the specific point in time, wherein the classification unit comprises a neural network for the classification of emotion and a neural network for the classification of gender, the neural network for the classification of emotion and the neural network for the classification of gender being optimized through learning using an objective function which is calculated using a loss of the classification of emotion and a loss of the classification of gender.

11. A non-transitory computer-readable storage medium storing a recognition model performed by an information processing apparatus, the recognition model comprising:

a first layer that performs convolution on an input value that is data indicating a speech, and makes output;

a second layer that extracts time-series features of the data indicating the speech with an output value of the first layer as an input value, and makes output;

a third layer that generates information obtained by weighting features at a specific point in time associated with emotion classification in an output value of the second layer by using self-attention, with the output value of the second layer as an input value, and makes output; and an output layer that outputs values indicating probabilities of emotion and gender based on an output value of the third layer, the output layer comprises a neural network for outputting the probability of emotion and a neural network for outputting the probability of gender, the neural network for outputting the probability of emotion and the neural network for outputting the probability of gender being optimized through learning using an objective function which is calculated using a loss of a classification of emotion and a loss of a classification of gender.

* * * * *